Figure 1:
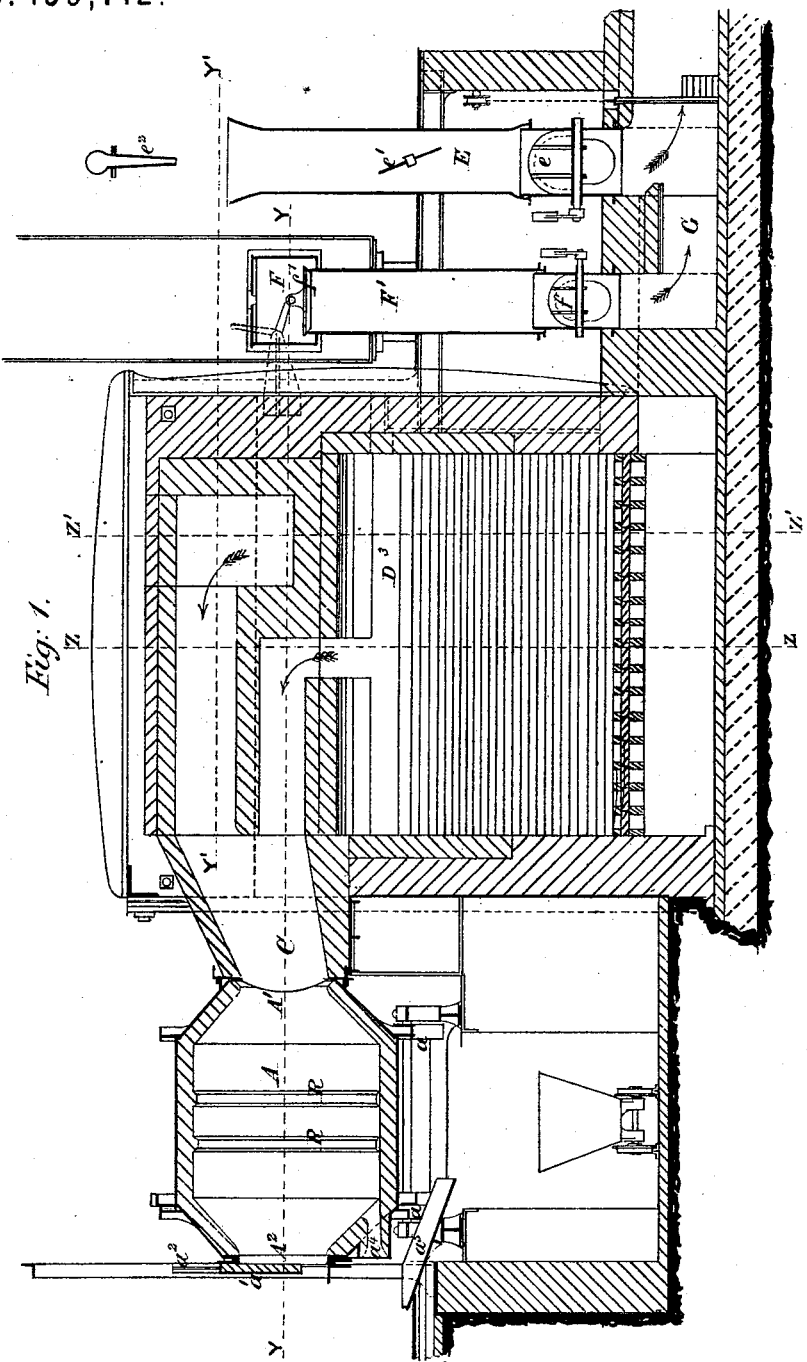

C. W. SIEMENS.
Manufacture of Iron and Steel.

No. 159,712.

3 Sheets--Sheet 1.

Patented Feb. 9, 1875.

Witnesses:
Chas. H. Isham
H. A. Daniels

Inventor:
C. William Siemens by
C. S. Whitman
Attorney

C. W. SIEMENS.
Manufacture of Iron and Steel.

No. 159,712.  Patented Feb. 9, 1875.

Witnesses:
Chas. H. Isham
H. A. Daniels

Inventor:
C. William Siemens
by C. S. Whitman
Attorney.

C. W. SIEMENS.
Manufacture of Iron and Steel.
No. 159,712. Patented Feb. 9, 1875.

Witnesses:
Chas. H. Isham
H. A. Daniels

Inventor:
C. William Siemens by
C. S. Whitman
Attorney.

UNITED STATES PATENT OFFICE.

CHARLES WILLIAM SIEMENS, OF WESTMINSTER, ENGLAND.

IMPROVEMENT IN THE MANUFACTURE OF IRON AND STEEL.

Specification forming part of Letters Patent No. 159,712, dated February 9, 1875; application filed May 27, 1873.

*To all whom it may concern:*

Be it known that I, CHARLES WILLIAM SIEMENS, of No. 3 Great George street, Westminster, county of Middlesex, England, have invented an Improved Process and Apparatus for the Manufacture of Iron and Steel; and do hereby declare that the following description, taken in connection with the accompanying sheets of drawings hereinafter referred to, forms a full and exact specification of the same, wherein I have set forth the nature and principles of my said improvement, by which my invention may be distinguished from others of a similar class, together with such parts as I claim and desire to secure by Letters Patent—that is to say:

This invention relates to a process and apparatus for effecting the separation of metallic iron from ores, and forming the metal into balls which may be treated for the production of wrought-iron or puddled steel, or transferred in a heated condition to a bath of highly-heated pig metal in a separate furnace, for conversion into cast-steel, or which may be converted into cast-steel or cast metal without being transferred to a separate furnace, the conversion of crude ore into cast-steel or cast metal being, in the latter case, effected in one apparatus, and by successive steps of one operation.

For this purpose the ore to be treated is crushed and mixed with a suitable proportion of lime, manganese, or other fluxing material, according to the relative amount and nature of the gangue which the ore contains, in order to form a fluid scoria; or a mixture of ores may be employed, which produces a fusible slag without admixture of lime or other fluxing material.

The mixed material is introduced into a slowly-rotating furnace, which I will presently describe, and heated nearly to the fusing-point of the ore, whereupon is added a quantity of reducing agent, such as coal or anthracite or coke, previously crushed but not ground fine, or charcoal or wood, previously dried and cut into pieces. By the slow rotation of the furnace this carbonaceous matter becomes covered by the heated ore, with which it is gradually mingled, while fresh intensely-heated surface is being continually presented to the mixture. A very powerful reaction is thus produced, and a quantity of carbonic oxide is evolved, which, in burning with the highly-heated air supplied from a regenerator, nearly suffices to maintain intense heat in the furnace without necessitating admission of additional gaseous fuel. The reduction of the ore under these conditions is effected rapidly, the gangue combining with the fluxing material, so as to form a fusible slag; and the rotation of the furnace being very slow, (from four to six revolutions per hour,) the particles of metallic iron in course of separation are not prematurely agglomerated.

When the reaction is complete, the rotation of the furnace is stopped, and the scoria is tapped off, so as to liberate the metallic iron resulting from the reaction. A fuller supply of gaseous fuel is then turned on, and the furnace is caused to rotate five or six times more rapidly than before. This more rapid rotation has the effect of agglomerating the iron into balls, which may be taken out of the furnace and subjected to the action of squeezers, hammers, or rolls, for the production of wrought-iron or puddled steel, or which may be transferred, while hot, to a bath of highly-heated pig metal for the production of cast-steel; or the balls, without being removed from the furnace, may be converted into cast-steel, or into a pure cast metal intermediate between cast-steel and cast-iron in the following manner:

After the balls are formed, the rotation of the furnace is again stopped, and the fluid scoria is again tapped off, whereupon the furnace is again caused to rotate slowly. Some hard carbonaceous substance, such as crushed anthracite or coke, is then introduced, while the heat of the furnace is raised to a high intensity. The balls, combining with the carbon, become fused into a fluid mass, which can be tapped and cast into forms or molds; or, instead of introducing hard carbonaceous substances to effect the fusion of the balls, broken pig metal, or spiegeleisen, or ferro-manganese may be employed for the same purpose, spiegeleisen or ferro-manganese being especially desirable or necessary if malleable cast-steel is to be produced.

The proportion of the carbonaceous matter required for the conversion of a certain quantity of ore depends upon the richness of the ore, and upon the nature of the carbonaceous matter employed, as well as on the nature of the iron or steel to be produced. In each case the proportions should be determined by experience; but under ordinary circumstances about half a ton of solid carbonaceous matter to the ton of metal to be produced will be found sufficient. If the reducing agent employed be anthracite or hard coke, it may be crushed moderately fine and charged into the furnace with the ore, and heated simultaneously therewith.

Figure 2:
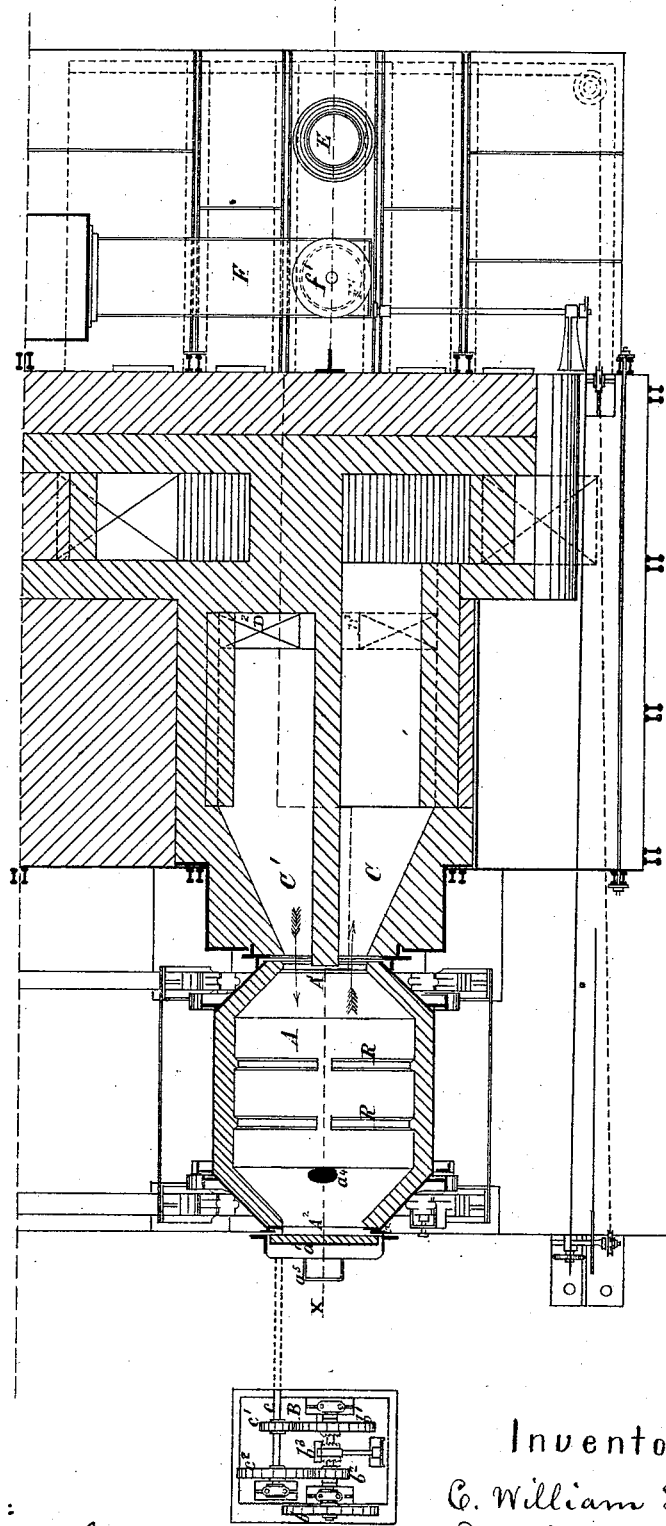
Figure 3:
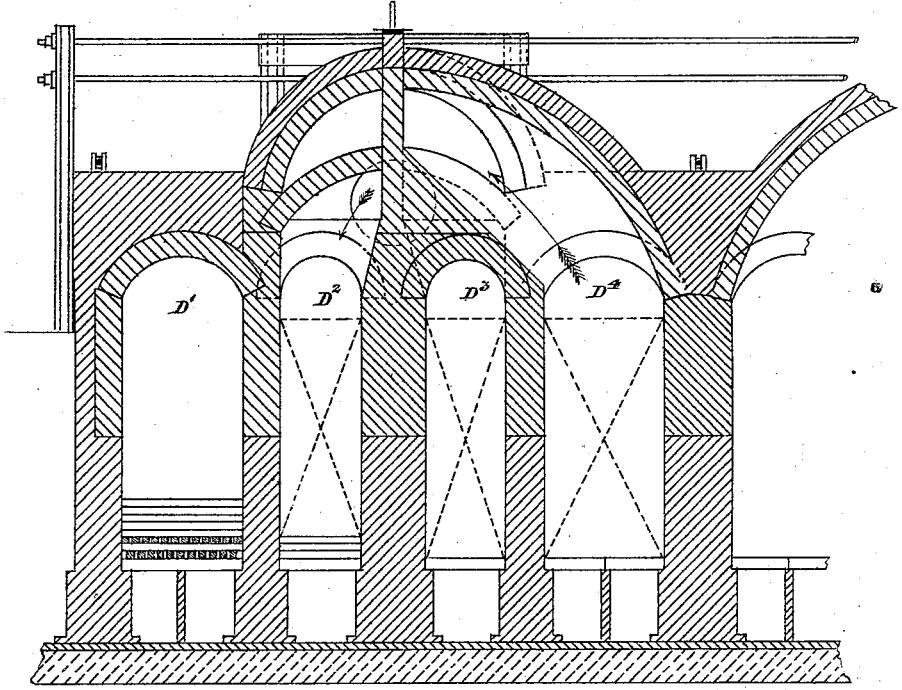
Figure 4:
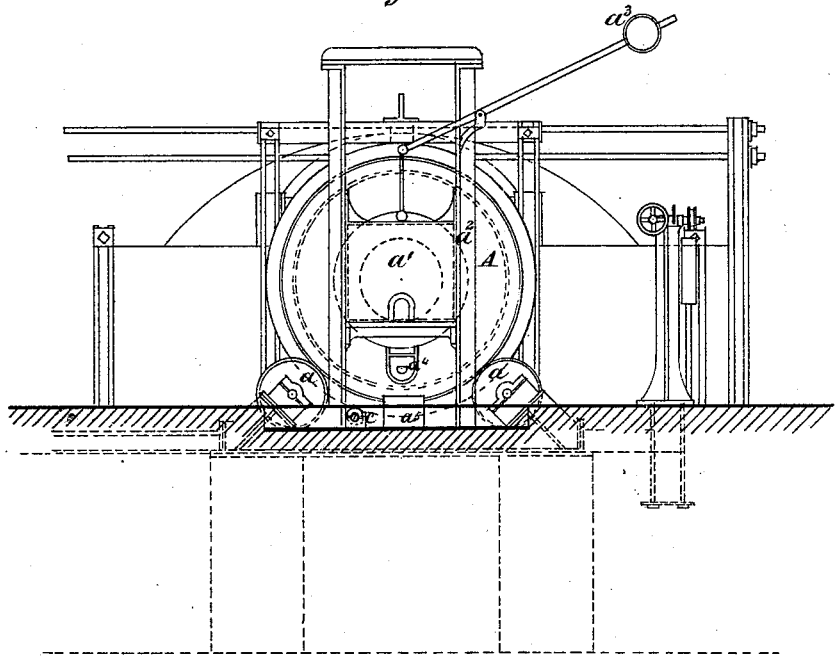

In effecting the process as described above, I employ a rotative regenerative gas-furnace, constructed and arranged as shown on Sheets I, II, and III of the accompanying drawings. Figure 1, Sheet I, represents a longitudinal section on line X X, Fig. 2. Fig. 2, Sheet II, represents a sectional plan on lines Y Y Y' Y', Fig. 1. Fig. 3, Sheet III, represents on the left-hand side a half transverse section on the line Z Z, Fig. 1, and on the right-hand side a half transverse section on the line Z' Z', Fig. 1; and Fig. 4, Sheet III, shows a front view.

A is the rotative furnace, in shape cylindrical, with truncated conical ends. It is mounted on rollers $a$ $a$, which are caused to revolve by gearing B, driven by any suitable power. The gearing B is arranged with clutch apparatus, so that the furnace can be rotated at either the slow or the quick speed above referred to, or brought to rest while the prime mover continues to work at its regular speed. For this purpose the gearing B consists of a wheel, $b^1$, and pinion $b^2$, loose on the shaft of the driving-wheel $b$, and gearing respectively with pinion $c^1$ and wheel $c^2$ on shaft $c$, which drives the rollers $a$. By means of a clutch, $b^3$, either the wheel $b^1$ or the pinion $b^2$ is geared with the driving-shaft, and thus a slow or a quick speed is imparted to the rotative furnace; or, by throwing the clutch out of gear, the furnace is brought to rest. The throat of the furnace at $A^1$ is in communication with two flues, C and C', each of which has two branches, communicating, respectively, with two of four regenerative chambers, $D^1$ $D^2$ $D^3$ $D^4$. The outer regenerative chambers, $D^1$ $D^4$, are for heating the air, and the two inner chambers, $D^2$ and $D^3$, are for heating the gas supplied to the furnace. The air is supplied by a main duct, E, provided with a reversing-valve, $e$, by which the supply can be turned toward either of the chambers $D^1$ or $D^4$, and with a throttle-valve, $e^1$, whereby the supply can be regulated. In order to increase the flow of air when intense heat is required in the furnace, a jet of compressed air, $e^2$, is introduced from a blast-pipe into the middle of the duct E.

The gas from the main supply-trunk F is introduced by a duct, F', which is provided with a stop-valve, $f'$, and with a reversing-valve, $f$, whereby the gas can be directed to either of the chambers $D^2$ or $D^3$. The air and gas thus supplied to the two regenerative chambers on the one side of the structure flow thence, heated, into one of the flues C or C', where they mingle and produce a powerful flame, which plays into and sweeps round the furnace A, the products of combustion escaping by the other of the flues C or C', through the other two regenerative chambers, and thence, by a flue, G, to a chimney or other outlet.

When one of the two pairs of regenerative chambers has been sufficiently heated by the escaping products of combustion, and the other pair cooled by passage of the incoming air and gas through them, the valves are moved so as to alter the direction of the inflowing and outflowing currents, in the manner well understood in reference to the working of regenerative gas-furnaces.

At the end, $A^2$, of the furnace opposite the throat is mounted, between guides $a^2$, a vertically-sliding door, $a^1$, with a counterbalance-weight, $a^3$. At the front of the furnace is formed a tap-hole, $a^4$, which can be plugged with refractory material, and under this there is a chute, $a^5$, by which material tapped from the furnace can be run into forms or molds, or into a truck in a pit below the furnace.

The lining of the furnace A may be of any known suitable refractory material that is not readily affected by scoria; but I prefer to use for it a lining formed in the following manner: I take the mineral known as bauxite, consisting chiefly of alumina, with a proportion of peroxide of iron. I calcine it and reduce it to powder, and mix with it from ten to fifteen per cent. of powdered plumbago, graphite, or other carbonaceous matter in a dense form, and such a quantity of argillaceous clay or other binding material as is necessary to give cohesion. I form this mixture into bricks or blocks of suitable form, and burn them in a kiln, in the usual way. In burning such bricks the oxide of iron contained in the bauxite is converted by the carbonaceous matter into metallic iron, and a very refractory material is thus produced, capable of resisting the action of scoria for a considerable time.

These bricks may be built inside the rotating furnace, with cement made from the above-named mixture, used in an unburnt condition; but I prefer to build them in loosely, and, after heating the furnace to a white heat, to charge it with pure ore or hammer-slag, while rotating slowly. The ore or slag is melted, and sinks into the crevices between the bricks, serving as a cement, which binds them firmly together, and also as a glaze, which prevents access of air to the interior of the bricks.

When the bricks are so cemented, the excess of fused ore or slag is tapped off, and the furnace is ready for work.

In employing it for effecting the process described above, a quantity—say one ton—of the mixed ore and flux is introduced by the door, which is then closed, and the furnace is made to rotate at its slow speed for about half an hour, till the mass becomes thoroughly heated to near its fusing-point. The reducing material, being then introduced, is gradually covered by the ore as it falls to the bottom of the furnace during rotation, and a rapid reducing action ensues. As carbonic oxide is evolved, a full supply of heated air is given to effect its combustion, the supply of gas coming from the regenerator being at the same time reduced or nearly stopped. In about one hour, the reduction is completed, the furnace is stopped with its tap-hole undermost, and the liquid scoria is tapped off, after which the full supply of producer-gas is given, and the furnace is caused to rotate at its rapid speed, whereby the precipitated metal is quickly balled.

In order to produce several balls of moderate size, instead of one large ball, which would be inconvenient to handle, I form internally-projecting circular ribs R in the lining of the furnace, which have the effect of dividing the mass, during balling, into several portions. A portion of these ribs is omitted in the line of the tap-hole, as shown in Fig. 2, so that there may be a clear passage for material to flow toward the front of the furnace when the tap-hole is opened.

The balls may be treated for wrought-iron or puddled steel by hammers, squeezers, or rolls, or they may be fused with pig metal, spiegeleisen, or ferro-manganese, for the production of cast metal or cast-steel, as above described.

Having thus described the nature of my invention, and the manner in which the same is to be practically carried out, I claim—

1. The method of effecting the separation of metallic iron from heated ore mingled with fluxing materials, by causing carbonaceous matter to be mixed therewith by means of the slow rotation of a rotative furnace, and forming the separated metal, by means of a quicker rotation, into balls, for the production of wrought-iron or puddled steel, or for the production of cast-steel by the employment of a separate furnace, substantially as herein described.

2. The method of separating metallic iron from ore, in the manner and by the means above referred to, and converting the separated metal into cast-iron or cast-steel, in one and the same rotative furnace, by the further addition of solid carbonaceous matter, cast-iron, spiegeleisen, or ferro-manganese, substantially as herein described.

3. A rotative regenerating gas-furnace for the manufacture of iron and steel, wherein the heated air and gas are admitted, and the products of combustion are emitted, at the one end or throat of the rotative furnace, and a working-door is provided at the other end, substantially as hereinbefore described with reference to the accompanying drawings.

In testimony whereof I have signed my name to this specification in presence of two subscribing witnesses this 21st day of February, 1873.

C. WILLIAM SIEMENS.

Witnesses:
 CHAS. D. ABEL,
 THOMAS TAYLOR.